Patented Aug. 7, 1928.

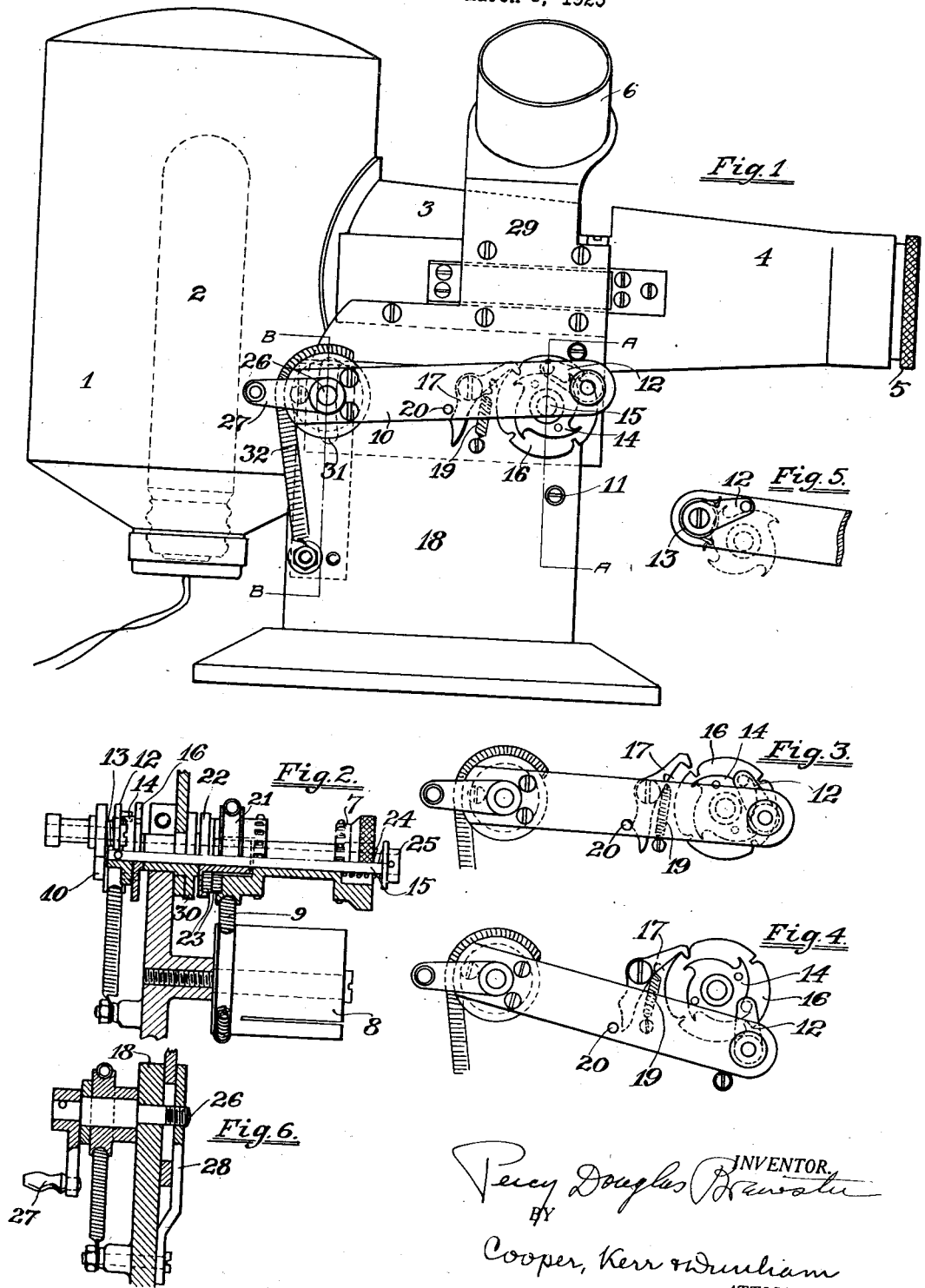

1,679,399

UNITED STATES PATENT OFFICE.

PERCY DOUGLAS BREWSTER, OF EAST ORANGE, NEW JERSEY, ASSIGNOR TO WYKO PROJECTOR CORPORATION, A CORPORATION OF NEW YORK.

FILM-FEEDING DEVICE FOR PROJECTORS.

Application filed March 2, 1925. Serial No. 12,512.

My invention relates to a projector adapted to project singly a series of pictures printed on a strip of film, usually corresponding in size to the standard motion picture film, comprising in effect a series of lantern slides printed on film.

My invention provides a convenient and inexpensive means for feeding the film through the projector, step by step, and means for framing the picture in the aperture gate.

My invention is illustrated in the accompanying drawing in which Fig. 1 is a side elevation of the projector. Fig. 2 is a part section on line A—A. Figs. 3 and 4 illustrate different positions of feeding arm. Fig. 5 a view from the inside of the arm illustrating the pawl operating the ratchet. Fig. 6 is a section on line B—B Fig. 1.

The optical parts of the projector are of the usual construction comprising, the lamp house 1, containing lamp 2 and the barrel 3 containing the condensing lenses, to which is hinged the nose piece 4 in which is mounted projecting lens 5. The film gate is formed between the barrel 3 and nose piece 4. It is usual construction in which springs serve to force the film against aperture plate, which is cut out to the image size on the film and is not illustrated. The film may be placed in the projector in any way desired, either in the receptacle 6, as described in my copending application Serial Number 12,511, filed March 2, 1925, or it may be fed from a reel or spool.

The film is drawn through the film gate by means of sprocket 7 (Fig. 2) and is taken up on spool 8 driven from the sprocket by wire belt 9.

The sprocket is preferably of the standard size feeding diameter, four pictures each revolution, so each quarter revolution feeds it down one image or picture space. In this type of film-stereopticon the pictures are fed through one by one according to the wish of the operator. The projector is fed one picture space by the operator depressing the feed lever 10 until it comes into contact with stop 11. Lever 10 is pivotally mounted near its left end on clamp screw 26. The spring 32 returns the feed lever for the next stroke. A pawl 12, mounted on lever 10, is forced by spring 13 into engagement with the ratchet 14, which is attached to sprocket shaft 15. This ratchet consists of four teeth, equally spaced, with which the pawl engages. In case a sprocket other than the usual four picture sprocket is used, the number of teeth on the ratchet are changed accordingly, so that a new picture is fed into the aperture for each stroke of the lever.

To stop the film so that it is accurately located or "framed" in the film gate, a second ratchet 16 is also mounted on sprocket shaft 15. This ratchet 16 has the same number of slots in its periphery that the first ratchet 12 has teeth. Pawl 17 is mounted on base 18 and forced against the ratchet 16 by spring 19. The side of each of the slots in ratchet 16, which engages the pawl 17 when the machine is fed, is cut in with a sharp edge that engages the pawl and stops the sprocket, while the other side of the slot is rounded off gradually but ends in a straight side slot. This rounding insures the pawl falling into slot no matter how rapid the feed, and after it is engaged and after the feed stops the pawl drops further down in the slot and prevents the sprocket from turning in either direction.

The pawl 17 has a tail piece consisting of a cam mechanism which engages with the pin 20 in the feed arm 10. The cam is so shaped that on both the feed stroke of the arm 10 and the return stroke it momentarily disengages the pawl 17 from the slots in ratchet 15 and allows the sprocket shaft to turn.

If the film has not been engaged with just the correct tooth on the sprocket, the picture will not be properly centered on the screen. This adjustment is secured by mounting the sprocket 7 and pulley 21 (operating wire belt to take-up spool 8) loosely on sprocket shaft 15. The collar 22 is pinned on shaft 15 and has one or more leather, cork or other friction washers 23, between it and the pulley 21. The sprocket and pulley are forced against these frictions by spring 24 acting against the collar 25 mounted on the shaft. The picture is framed by pulling out the sprocket against the spring action when the sprocket turns freely on the shaft and at the same time operates the take-up spool.

The projector may be tilted so as to change the position of the picture on the screen by moving the barrel and lamp house in relation to the base.

The barrel 3 and the lamp house 1 are mounted on the side plate 29, to which the receptacle is attached. This plate is mounted to turn on shaft 15 (on the bushing 30 in the base 18—Fig. 2) the action being limited by the radial slot 31 through which the clamp screw 26 passes. The clamping screw 26 is threaded in the spring 28 which locks the side plate when screw is tightened. Loosening the clamp screw 26 permits the movement of the side plate and consequently moves the picture on the screen.

In the specification and claims a "frame" is understood to be a single picture on the strip of film.

I claim:

1. In a projector adapted to show a strip of film frame by frame, a feed mechanism comprising a suitable film gate, a sprocket adapted to engage the perforations in the said film, a shaft through the said sprocket, a feed ratchet carrying teeth mounted on said shaft, a feed lever pivoted on a fixed part of the machine carrying a pawl adapted to engage the said teeth and feed the film, a locking ratchet mounted on the said shaft carrying the same number of slots as the said feed ratchet has teeth, a pawl mounted to engage in the said slots and lock the sprocket, and a pin mounted on the said feed lever adapted to disengage the locking pawl at the beginning of the feed stroke of the lever.

2. In a projector adapted to show a strip of film frame by frame, a barrel and lamp house containing the lamp and optical parts, a flat side plate attached to the said barrel, a base, a sprocket shaft mounted to turn on the said base, the said side plate being mounted to turn concentrically with the said sprocket shaft, and clamping mechanism adapted to lock the said barrel and said lamp house at any desired angle to the base.

Signed at East Orange, in the county of Essex and State of New Jersey, this 26th day of February A. D. 1925.

PERCY DOUGLAS BREWSTER.